US012107748B2

United States Patent
Shirasuka (10) Patent No.: US 12,107,748 B2
(45) Date of Patent: Oct. 1, 2024

(54) INFORMATION PROCESSING DEVICE, NON-TRANSITORY COMPUTER-READABLE STORAGE MEDIUM, AND INFORMATION PROCESSING METHOD

(71) Applicant: Mitsubishi Electric Corporation, Tokyo (JP)

(72) Inventor: Keiichi Shirasuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 478 days.

(21) Appl. No.: 17/623,281

(22) PCT Filed: Jul. 18, 2019

(86) PCT No.: PCT/JP2019/028258
§ 371 (c)(1),
(2) Date: Dec. 28, 2021

(87) PCT Pub. No.: WO2021/009902
PCT Pub. Date: Jan. 21, 2021

(65) Prior Publication Data
US 2022/0417123 A1 Dec. 29, 2022

(51) Int. Cl.
*H04L 12/28* (2006.01)
*G06F 15/16* (2006.01)
(Continued)

(52) U.S. Cl.
CPC ........ *H04L 43/087* (2013.01); *H04L 41/0631* (2013.01); *H04L 43/022* (2013.01); *H04L 43/0864* (2013.01)

(58) Field of Classification Search
CPC ............. H04L 43/0852; H04L 43/087; H04L 12/40026; H04L 41/0631; H04L 43/022;
(Continued)

(56) References Cited

U.S. PATENT DOCUMENTS

| 7,702,941 B2 * | 4/2010 | Lienhart | H04J 3/0667 713/400 |
| 7,948,915 B2 * | 5/2011 | Hinnant, Jr. | G01D 21/00 370/237 |
| 8,861,352 B2 * | 10/2014 | Bejerano | H04L 12/66 370/230.1 |
| 10,491,530 B2 * | 11/2019 | Takada | H04L 12/40163 |

(Continued)

FOREIGN PATENT DOCUMENTS

| JP | 2001-352316 A | 12/2001 |
| JP | 2010-232845 A | 10/2010 |

(Continued)

OTHER PUBLICATIONS

International Search Report and Written Opinion mailed on Oct. 15, 2019, received for PCT Application PCT/JP2019/028258, Filed on Jul. 18, 2019, 7 pages including English Translation.

*Primary Examiner* — Edan Orgad
*Assistant Examiner* — Vanneilian Lalchinthang
(74) *Attorney, Agent, or Firm* — XSENSUS LLP (57) ABSTRACT

An information processing device includes a reception I/F unit, a reception-time-point measuring unit, and an event-detection-time-point estimation unit. The event-detection-time-point estimation unit estimates an event detection time point, which is a time point at which an event corresponding to latest detection data is detected, from a minimum system delay time, a minimum-system-delay jitter, and a time period from detection of the event corresponding to a target data to detection of the event corresponding to latest detection data. The minimum-system-delay jitter is the difference between a minimum-reception-time expected reception time point and the reception time point of the target detection data. The minimum-reception-time expected reception time point is calculated to be a time point at which the target data is received before the latest detection data. The target detection data is one piece of detection data, out of the
(Continued)

multiple pieces of detection data, sent with a minimum system delay time.

7 Claims, 9 Drawing Sheets

(51) Int. Cl.
    *H04J 3/06*           (2006.01)
    *H04L 41/0631*    (2022.01)
    *H04L 43/022*     (2022.01)
    *H04L 43/0864*    (2022.01)
    *H04L 43/087*     (2022.01)

(58) Field of Classification Search
    CPC .............. H04L 47/34; H04L 43/0864; H04L 12/40163; H04L 65/80; H04L 2012/6472; G08C 15/00; H04J 3/0685; H04J 3/0664; H04J 3/0667; H04Q 9/00
    USPC .......................................... 370/252
    See application file for complete search history.

(56) References Cited

U.S. PATENT DOCUMENTS

| | | | |
|---|---|---|---|
| 10,749,534 B2 * | 8/2020 | Nelson | H03L 7/1075 |
| 2002/0009054 A1 * | 1/2002 | Suzuki | H04L 47/2416 370/252 |
| 2008/0107221 A1 * | 5/2008 | Yamanaka | H04L 1/0001 375/371 |
| 2010/0246788 A1 * | 9/2010 | Menard | H04M 3/56 379/159 |
| 2010/0250781 A1 * | 9/2010 | Matsunaga | H04J 3/0685 709/248 |
| 2010/0290454 A1 * | 11/2010 | Lundberg | H04L 49/9023 370/352 |
| 2015/0350099 A1 * | 12/2015 | Sun | H04W 48/18 370/412 |
| 2018/0351839 A1 * | 12/2018 | Shirasuka | H04L 41/0681 |

FOREIGN PATENT DOCUMENTS

| | | |
|---|---|---|
| JP | 2011-151752 A | 8/2011 |
| WO | 2017/154296 A1 | 9/2017 |

* cited by examiner

SENSING TIME POINT ESTIMATION METHOD

④SENSING TIME POINT = ① EXPECTED RECEPTION TIME POINT − ② JITTER AT MINIMUM RECEPTION TIME − ③ MINIMUM DELAY TIME (PREMEASUREMENT)

$$T_{a\_me\_i} = \underbrace{T_{a\_me\_min} + (i - i_{min}) \cdot T_{sa}}_{①} + \underbrace{\frac{1}{N} \sum_{i=i-N+1}^{N} (T_{r\_i} - (T_{a\_me\_min} + (i - i_{min}) \cdot T_{sa}))}_{⑤ = T_{j\_i}}$$

$$T_{MS\_ic} = \underbrace{T_{a\_me\_min} + (i - i_{min}) \cdot T_{sa}}_{①} - \underbrace{T_{j\_min}}_{②} - \underbrace{T_{t\_min}}_{③}$$

INFORMATION PROCESSING DEVICE, NON-TRANSITORY COMPUTER-READABLE STORAGE MEDIUM, AND INFORMATION PROCESSING METHOD

CROSS-REFERENCE TO RELATED APPLICATION

The present application is based on PCT filing PCT/JP2019/028258, filed Jul. 18, 2019, the entire contents of which are incorporated herein by reference.

TECHNICAL FIELD

The present invention relates to an information processing device, a non-transitory computer-readable storage medium, and an information processing method.

BACKGROUND ART

When information from sensors is remotely collected via wireless or wired transmission paths and processed, it is usually difficult for the receiving side to grasp the time point at which an event occurred on the transmitting side due to the influence of fluctuation in the delay time of the transmission paths.

Conventionally, there is a technique for controlling the clock on the receiving side in synchronization with the clock on the transmitting side by time point synchronization packets (for example, refer to Patent Literature 1). This provides a time stamp indicating the time point at which an event occurred on the transmitting side to a transmission packet after synchronization of clocks at both the transmitting side and the receiving side, and enables the receiving side to grasp the time point at which the event occurred on the receiving side.

The conventional technique is, for example, applicable to a camera system that requires time point synchronization of multiple video cameras or a control system that requires time point synchronization between a control device and a controlled device.

PRIOR ART REFERENCE

Patent Reference

Patent Literature 1: Japanese Patent Application Publication No. 2010-232845

SUMMARY OF THE INVENTION

Problem to be Solved by the Invention

However, if the transmitting side is a simple sensor, the sensor may not have a system clock for counting time.

Even if the transmitting side has a system clock, a phase locked loop (PLL) may be required to drive the clock at the same clock frequency as that of the receiving side, or a function of transmitting time point synchronization packets may be required to correct the clock deviation between the system clock of the transmitting side and the system clock of the receiving side.

Accordingly, it is an object of one or more aspects of the present invention to enable the receiving side to readily estimate the time point at which an event is detected.

Means of Solving the Problem

An information processing device according to an aspect of the invention includes a receiver to sequentially receive multiple pieces of detection data sent from a sensor detecting an event during a sampling period, the sampling period being fixed; a reception-time-point measuring unit to measure reception time points at which the multiple pieces of detection data are respectively received; a minimum-system-delay-time storage unit to store a minimum system delay time, the minimum system delay time being predetermined as a minimum value of system delay times each corresponding to a time from a time point at which the sensor detects the event to the corresponding reception time point; a minimum-reception-time expected-reception-time-point storage unit to store a minimum-reception-time expected reception time point calculated to be a time point at which target detection data is to be received, the target detection data being one piece of detection data, out of the multiple pieces of detection data, sent with a minimum time of the system delay times before latest detection data is received; a jitter estimation unit to estimate a minimum-system-delay jitter to be a difference between the minimum-reception-time expected reception time point and the reception time point of the target detection data; and an event-detection-time-point estimation unit to estimate an event detection time point from the minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

A program according to an aspect of the invention that causes a computer to function as: a receiver to sequentially receive multiple pieces of detection data sent from a sensor detecting an event during a sampling period, the sampling period being fixed; a reception-time-point measuring unit to measure reception time points at which the multiple pieces of detection data are respectively received; a minimum-system-delay-time storage unit to store a minimum system delay time, the minimum system delay time being predetermined as a minimum value of system delay times each corresponding to a time from a time point at which the sensor detects the event to the corresponding reception time point; a minimum-reception-time expected-reception-time-point storage unit to store a minimum-reception-time expected reception time point calculated to be a time point at which target detection data is to be received, the target detection data being one piece of detection data, out of the multiple pieces of detection data, sent with a minimum time of the system delay times before latest detection data is received; a jitter estimation unit to estimate a minimum-system-delay jitter to be a difference between the minimum-reception-time expected reception time point and the reception time point of the target detection data; and an event-detection-time-point estimation unit to estimate an event detection time point from the minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

An information processing method according to an aspect of the invention includes: sequentially receiving multiple pieces of detection data sent from a sensor detecting an event during a sampling period, the sampling period being fixed; measuring reception time points at which the multiple pieces of detection data are respectively received; storing a minimum-reception-time expected reception time point calculated to be a time point at which target detection data is to be received, the target detection data being one piece of detection data, out of the multiple nieces of detection data, sent with a minimum time of the delay times before latest detection data is received, the system delay time being a time from a time point at which the sensor detects the event to the corresponding reception time point; estimating a minimum-system-delay jitter to be a difference between the minimum-reception-time expected reception time point and the reception time point of the target detection data; and estimating an event detection time point from a minimum value of the system delay time predetermined as a minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

Effects of the Invention

According to one or more aspects of the present invention, the receiving side can readily estimate the time point at which the event is detected.

MODE FOR CARRYING OUT THE INVENTION

Figure 1:
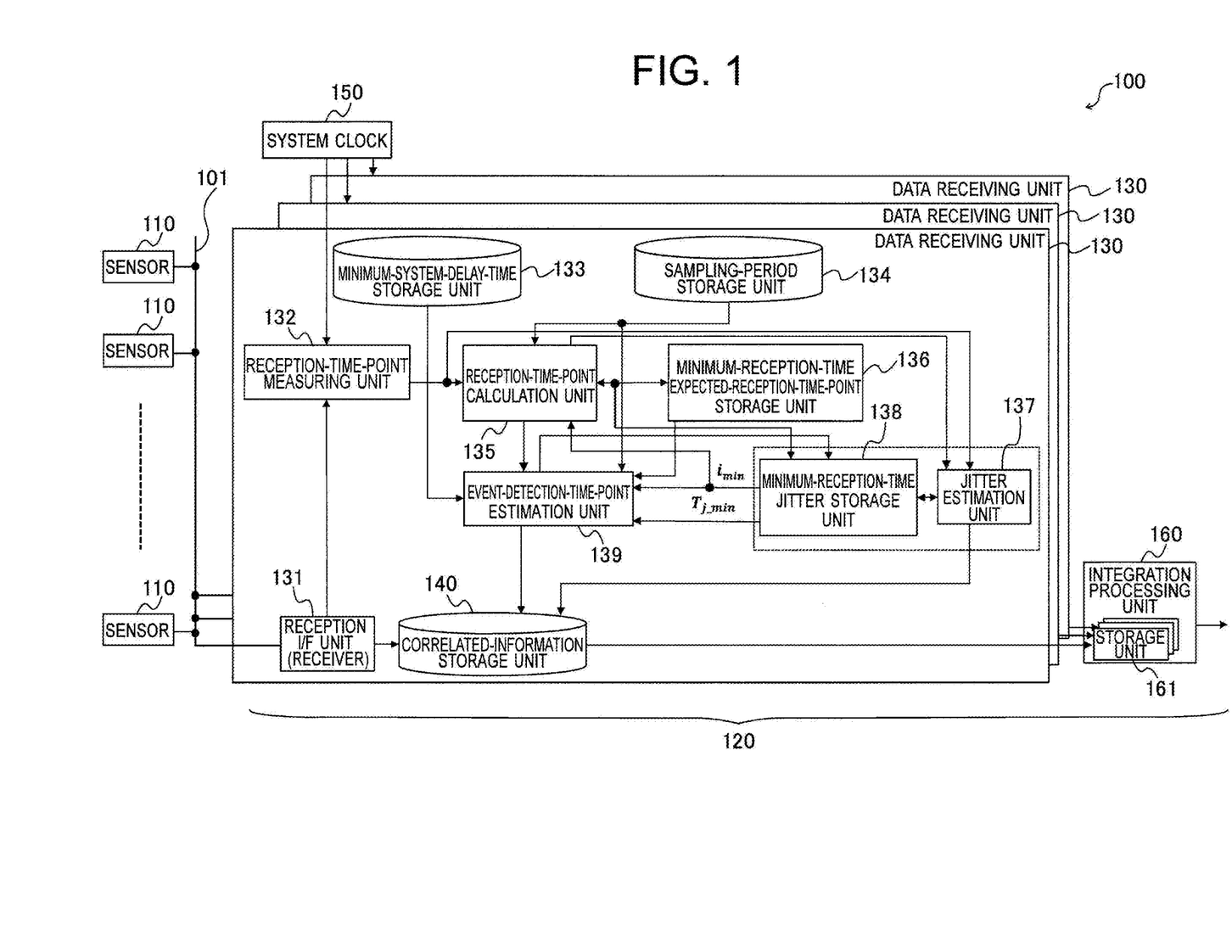
FIG. 1 is a block diagram schematically illustrating the configuration of a communication system according to an embodiment.

FIG. 1 is a block diagram schematically illustrating the configuration of a communication system 100 according to an embodiment.

As illustrated in FIG. 1, the communication system 100 includes a plurality of sensors 110 that detect events, and an information processing device 120 that receives multiple pieces of detection data (also referred to as sensor data) from the respective sensors 110 and processes the detection data.

The sensors 110 each detects events during fixed sampling periods. The sensor 110 is a transmitting device that transmits detection data indicating a detection result generated by detecting an event. The detection target of the sensor 110 is not limited. The sensor 110 is, for example, a position sensor that detects the position of an object or a speed sensor that detects the speed of an object. Although three sensors 110 are illustrated in FIG. 1, the number of sensors 110 may be any number such as one or more.

The sensor 110 performs sensing or detection of events during fixed detection periods (also referred, to as sampling periods) $T_{sa}$, i.e., at constant time intervals, processes a signal generated by the sensing, and sends detection data indicating the processing result to a transmission path 101. The transmission path 101 is a signal transmission path for wireless or wired communication. The transmission path 101 can be, for example, a network such as the Internet or a local area network (LAN), a bus, a telephone communication network, or a leased line.

The information processing device 120 includes data receiving units 130, a system clock 150, and an integration processing unit 160.

The information processing device 120 includes a plurality of data receiving units 130 that are receiving devices for receiving multiple pieces of detection data from the plurality of sensors 110. The data receiving units 130 are connected to the transmission path 101 so as to be able to communicate with the sensors 110. FIG. 1 illustrates three data receiving units 130, but the number of data receiving units 130 may be any number such as one or more.

The detection data sent from the sensors 110 during fixed periods is input to the data receiving units 130, for example, via the transmission path 101.

The data receiving units 130 each estimates an event detection time point, which is a time point at which the corresponding sensor 110 detects an event, by calculating the event detection time point by using a system time point obtained from the system clock 150. The data receiving unit 130 then correlates the received detection data with an estimated event detection time point $T_{MS\_ic}$, and feeds the correlated data to the integration processing unit 160 as correlated information. Here, the character i denotes a communication sequence number indicating the order in which detection data is received by the data receiving unit 130 and is an integer of "0" or more.

The system clock 150 is a timing unit for measuring system time points. It is presumed that a system time point measured by the system clock 150 indicates the current time point. For example, the system clock 150 can be implemented by a clock that measures time points or a device that receives signals indicating time points provided externally. Although the system clock 150 is illustrated in FIG. 1 as a separate configuration from the data receiving units 130, the system clock 150 may be part of the data receiving units 130 or part of the integration processing unit 160.

The integration processing unit 160 receives multiple pieces of correlated information from the data receiving units 130 and performs integration processing of detection data on the basis of the correlated information.

For example, when the detection data is position data of an object as a target to be detected or a detection target, the integration processing unit 160 can grasp the position of the object by calculating the position of the object at a time point different from the event detection time points $T_{MS\_ic}$ on the basis of correlated information correlating the position data indicating the positions of the same object detected by the sensors 110 and the event detection time points $T_{MS\_ic}$, which are estimated time points at which the sensors 110 detected the position of the object.

The integration processing unit 160 may include storage units 161 for storing correlated information. The storage units 161 may be part of the integration processing unit 160 or a storage device provided outside the integration processing unit 160.

The integration processing unit 160 treats the positions of the object detected by the sensors 110 as a function of time and calculates the position of the object at any time point, to grasp the position of the object. Therefore, the communication system 100 illustrated in FIG. 1 can grasp an object position by calculating the object position, such as the current position of the object as the detection target or the predicted position as the future position of the object as the detection target.

Furthermore, the integration processing unit 160 can determine whether or not the objects detected by the sensors 110 are the same object. Since the integration processing unit 160 utilizes multiple pieces of position data included in the multiple pieces of detection data sent from the sensors 110, the reliability of the position data of the detected object can be improved.

In order to perform the integration process described above with high accuracy, required is not only the position data of the object detected by the sensors 110 but also accurate time information of the event detection time points, which are the time points at which the object is detected by the sensors 110. Explained below is how the communication system 100 according to the first embodiment estimates, with high accuracy, time points at which the sensors detect an object, that is, event detection time points $T_{MS\_ic}$.

Each of the data receiving units 130 basically has the same configuration. Therefore, the configuration of one of the data receiving unit 130 will now be described.

The data receiving unit 130 includes a reception interface unit (hereinafter referred to as reception I/F unit) 131, a reception-time-point measuring unit 132, a minimum-system-delay-time storage unit 133, a sampling-period storage unit 134, a reception-time-point calculation unit 135, a minimum-reception-time expected-reception-time-point storage unit 136, a jitter estimation unit 137, a minimum-reception-time jitter storage unit 138, an event-detection-time-point estimation unit 139, and a correlated-information storage unit 140.

The reception I/F unit 131 functions as a receiver for sequentially receiving multiple pieces of detection data sent from a corresponding sensor 110. When the reception I/F unit 131 receives detection data, it feeds a data reception notification for notifying the reception-time-point measuring unit 132 about the reception of the detection data. Here, the reception time point of the i-th received detection data is denoted as $T_{r\_i}$.

The reception-time-point measuring unit 132 measures a reception time point, which is the time point at which the detection data is received, by referring to the system time point from the system clock 150 each time a data reception notification is received. In other words, the reception-time-point measuring unit 132 functions as a reception-time-point acquiring unit for acquiring the reception time point at which the detection data is received.

The minimum-system-delay-time storage unit 133 stores a minimum system delay time predetermined as a minimum value of the system delay time. The system delay time is the time from an event detection time point or the time point at which a sensor 110 detects an event to a reception time point at which the reception I/F unit 131 receives the detection data corresponding to the event. The minimum system delay time is presumed to be a premeasured fixed value.

The sampling-period storage unit 134 stores the sampling periods of corresponding sensors 110.

The reception-time-point calculation unit 135 calculates an expected reception time point, which is a time point at which the latest detection data is received, from the minimum-reception-time expected reception time point, the reception time point of the latest detection data, and the sampling period. Specifically, this is as follows.

The reception-time-point calculation unit 135 calculates average jitter, which is the distribution average of jitter $T_{j\_i}$ as a fluctuation time component of a system delay time. The system delay time is the time from an event detection time point of a corresponding sensor 110 to a reception time point $T_{r\_i}$ of the reception I/F unit 131. The average jitter of the i-th received detection data is denoted as $T_{j\_me\_i}$.

Here, N denotes a prescribed number of samples (N is an integer of two or more), K denotes an integer that increases by one for each sampling ($0 \leq K \leq N$), $T_{a\_me\_min}$ denotes a minimum-reception-time expected reception time point or an expected reception time point when data is received with minimum transmission delay, and $i_{min}$ denotes the corresponding communication sequence number or minimum communication sequence number. In such a case, the average jitter $T_{j\_me\_i}$ can be calculated by the following expressions (1) and (2). Note that jitter is defined as the deviation of the actual reception time point from the expected reception time point.

[Expression 1]

$$T_{j\_me\_i} = \frac{1}{N} \sum_{i=i-N+1}^{N} T_{j\_i} \quad (1)$$

[Expression 2]

$$T_{j\_i} = T_{r\_i} - \{T_{a\_me\_min} + (i - i_{min}) \cdot T_{sa}\} \quad (2)$$

However, for the first reception of detection data, the expression (1) is replaced with $T_{j\_me\_i} = T_{r\_0}$. The expression (1) is replaced with the following expression (3) for detection data reception until K reaches the prescribed number of samples N.

[Expression 3]

$$T_{j\_me\_i} = \frac{1}{K} \sum_{i=0}^{K-1} T_{j\_i} \quad (3)$$

Next, the reception-time-point calculation unit 135 time-shifts, with the minimum-reception-time expected reception time point as a starting point, the minimum-reception-time expected reception time point by a time obtained by multiplying the sampling period $T_{sa}$ by the difference between the corresponding communication sequence number $i_{min}$ and the current communication sequence number i, and adds the obtained average jitter $T_{j\_me\_i}$, to calculate a new expected reception time point $T_{a\_me\_i}$, which is the expected reception time point of the detection data to be received next. This calculation is performed by the following expression (4).

[Expression 4]

$$T_{a\_me\_i} = T_{a\_me\_min} + (i - i_{min}) \cdot T_{sa} + T_{j\_me\_i} \quad (4)$$

The above expression uses the principle that the premeasured minimum system delay time $T_{t\_min}$ is equal to, i.e., substantially equal to the minimum system delay time during the operation after the measurement, and the principle that the minimum system delay time $T_{t\_min}$ does not change even if the expected reception time point $T_{a\_me\_i}$ changes due to the occurrence of environmental fluctuation during operation after the premeasurement. The normal bandwidth usage on the network serving as the transmission path 101 is designed to be sufficiently lower than the maximum communication volume available on the network. Therefore, the minimum system delay time at the time of premeasurement and the minimum system delay time after the premeasurement are both the minimum time for when data is transmitted to the transmission path 101 without bus contention, and are considered to be the same time (minimum system delay time) $T_{t\_min}$.

Here, the jitter is defined as the time obtained by subtracting the reception time point of a piece of detection data from the expected reception time point of this detection data.

In such a case, if it is presumed that the system delay time is the shortest for the h-th detection data (where h is an integer satisfying $0 \le h < i$) while the event detection time point of the i-th detection data or the latest detection data is estimated, the minimum-system-delay litter $T_{j\_min}$, which is the jitter of the minimum system delay time, equals the time obtained by subtracting the reception time point $T_{r\_h}$ from the corresponding event detection time point $T_{a\_me\_h}$. In such a case, the h-th detection data is also referred to as target detection data. Note that the detection data sent with the minimum system delay time while the event detection time point of the h-th detection data is being estimated is also referred to as previous target detection data.

The minimum system delay jitter $T_{j\_min}$ can be determined by the data receiving unit 130 during operation as follows.

When the detection data sent with the minimum system delay time is received, the jitter $T_{j\_i}$ determined by the jitter estimation unit 137 to be described later becomes maximum. Therefore, when the reception time point $T_{r\_i}$ is earlier than the expected reception time point $T_{a\_me\_i}$, the jitter $T_{j\_i}$ determined by the jitter estimation unit 137 is stored in the minimum-reception-time jitter storage unit 138 as a minimum-system-delay jitter $T_{j\_min}$ if the jitter $T_{j\_i}$ is larger than the previous maximum values, in other words, if the jitter $T_{j\_i}$ is a new maximum value.

Here, the minimum-reception-time expected-reception-time-point storage unit 136 stores the expected reception time point $T_{a\_me\_h}$ as a minimum-reception-time expected reception time point $T_{a\_me\_min}$, where the expected reception time point $T_{a\_me\_h}$ is calculated to be the time point at which the target detection data, which is one piece of detection data sent with the minimum system delay time, is received before the latest detection data is received.

The minimum-reception-time expected reception time point $T_{a\_me\_min}$ is the expected reception time point of the target detection data calculated by the reception-time-point calculation unit 135 from the previous minimum-reception-time expected reception time point calculated to be the expected reception time point of the previous target detection data, the reception time point of the target detection data, and the sampling period before the target data is received by the reception I/F unit 131. Note that the minimum-reception-time expected reception time point $T_{a\_me\_min}$ is updated by the reception-time-point calculation unit 135 while the litter estimation unit 137 detects the maximum value of the jitter $T_{j\_i}$.

The jitter estimation unit 137 estimates the jitter $T_{j\_i}$ of the reception data and stores the maximum jitter $T_{j\_i}$ as minimum-system-delay jitter $T_{j\_min}$ in the minimum-reception-time jitter storage unit 138.

The minimum-reception-time jitter storage unit 138 stores a communication sequence number h for when the minimum-system-delay jitter $T_{j\_min}$ is measured as a minimum communication sequence number $i_{min}$ together with the minimum-system-delay jitter $T_{j\_min}$.

The event-detection-time-point estimation unit 139 estimates an event detection time point, which is a time point at which an event corresponding to the latest detection data is detected, from the minimum system delay time, the minimum-reception-time expected reception time point, the time period from the detection of the event corresponding to the target detection data to the detection of the event corresponding to the latest detection data, and the minimum-system-delay jitter. Here, the event-detection-time-point estimation unit 139 estimates the event detection time point $T_{MS\_ic}$ by calculating the event detection time point $T_{MS\_ic}$ by using the minimum system delay time $T_{t\_min}$, the minimum-reception-time expected reception time point $T_{a\_me\_min}$, the sampling period $T_{sa}$, the minimum-system-delay litter $T_{j\_min}$, and the minimum communication sequence number $i_{min}$.

Figure 2:
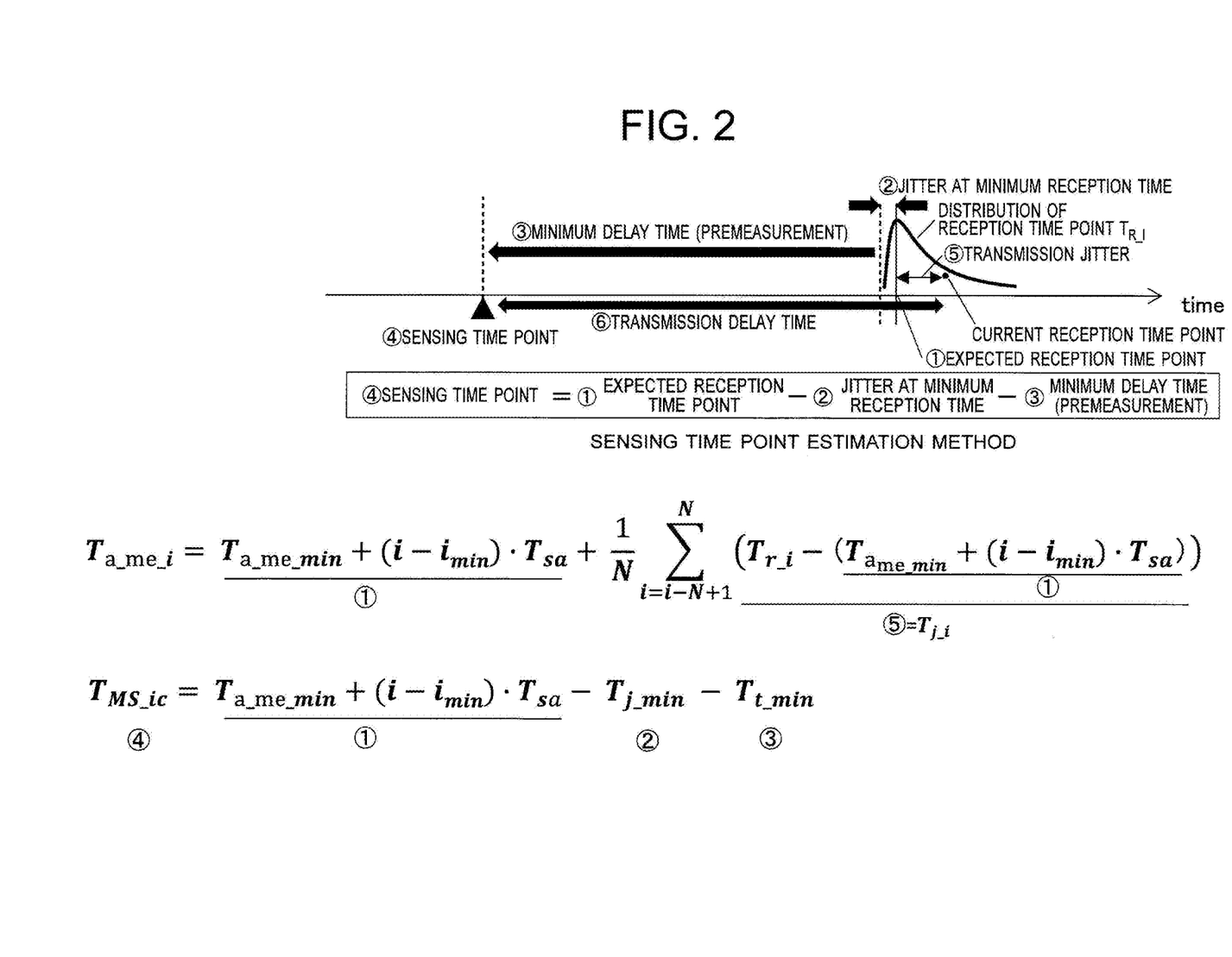
FIG. 2 is a schematic diagram for explaining the calculation of an event detection time point.

As illustrated in FIG. 2, the event detection time point $T_{MS\_ic}$ can be determined by subtracting the minimum-system-delay jitter $T_{j\_min}$ and the premeasured minimum system delay time $T_{t\_min}$ from the expected reception time point time-shifted, with the minimum-reception-time expected reception time point $T_{a\_me\_min}$ as a starting point, to the time corresponding to the current communication sequence number i. This calculation is represented by the following expression (5).

[Expression 5]

$$T_{MS\_ic} = T_{a\_me\_min} + (i - i_{min}) \cdot T_{sa} - T_{j\_min} - T_{t\_min} \quad (5)$$

The correlated-information storage unit 140 stores correlated information correlating the event detection time point $T_{MS\_ic}$ from the event-detection-time-point estimation unit 139, the jitter $T_{j\_i}$ from the jitter estimation unit 137, and detection data (communication sequence number i) from the reception I/F unit 131.

The integration processing unit 160 performs integration processing by using the correlated information stored in the correlated-information storage unit 140. For example, the integration processing unit 160 collectively outputs the detection data correlated with the past event detection time points corresponding to the maximum waiting time from the correlated information during each fixed period.

Figure 3A:
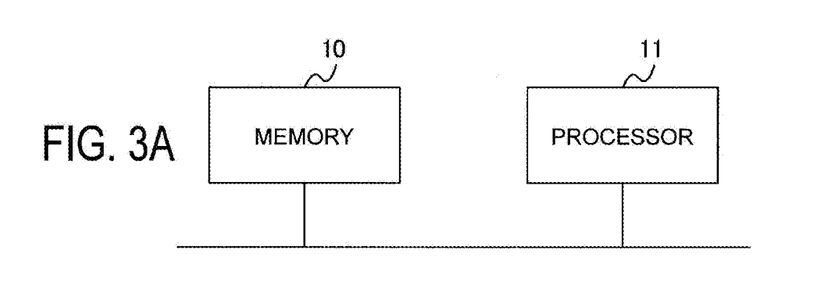
FIGS. 3A and 3B are block diagrams illustrating hardware configuration examples.

A portion or the entirety of the reception-time-point measuring unit 132, the reception-time-point calculation unit 135, the jitter estimation unit 137, the event-detection-time-point estimation unit 139, the system clock 150, and the integration processing unit 160 described above can be implemented by, for example, a memory 10 and a processor 11, such as a central processing unit (CPU), that executes the programs stored in the memory 10, as illustrated in FIG. 3A. Such programs may be provided via a network or may be recorded and provided on a recording medium. That is, such programs may be provided as, for example, program products. The information processing device 120 may be implemented by a computer.

Figure 3B:
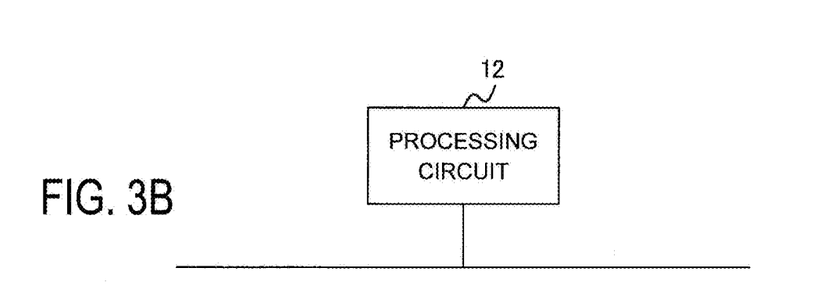

A portion or the entirety of the reception-time-point measuring unit 132, the reception-time-point calculation unit 135, the jitter estimation unit 137, the event-detection-time-point estimation unit 139, the system clock 150, and the integration processing unit 160 can be implemented by, for example, a processing circuit 12, such as a single circuit, a composite circuit, a programmed processor, a parallel programmed processor, an application specific integrated circuit (ASIC), or a field programmable gate array (FPGA), as illustrated in FIG. 3B.

Note that the reception I/F unit 131 can be implemented by a communication device, such as a network interface card (NIC).

The minimum-system-delay-time storage unit 133, the sampling-period storage unit 134, the minimum-reception-time expected-reception-time-point storage unit 136, the minimum-reception-time jitter storage unit 138, the correlated-information storage unit 140, and the storage units 161 can be implemented by a volatile or nonvolatile memory.

Figure 4:
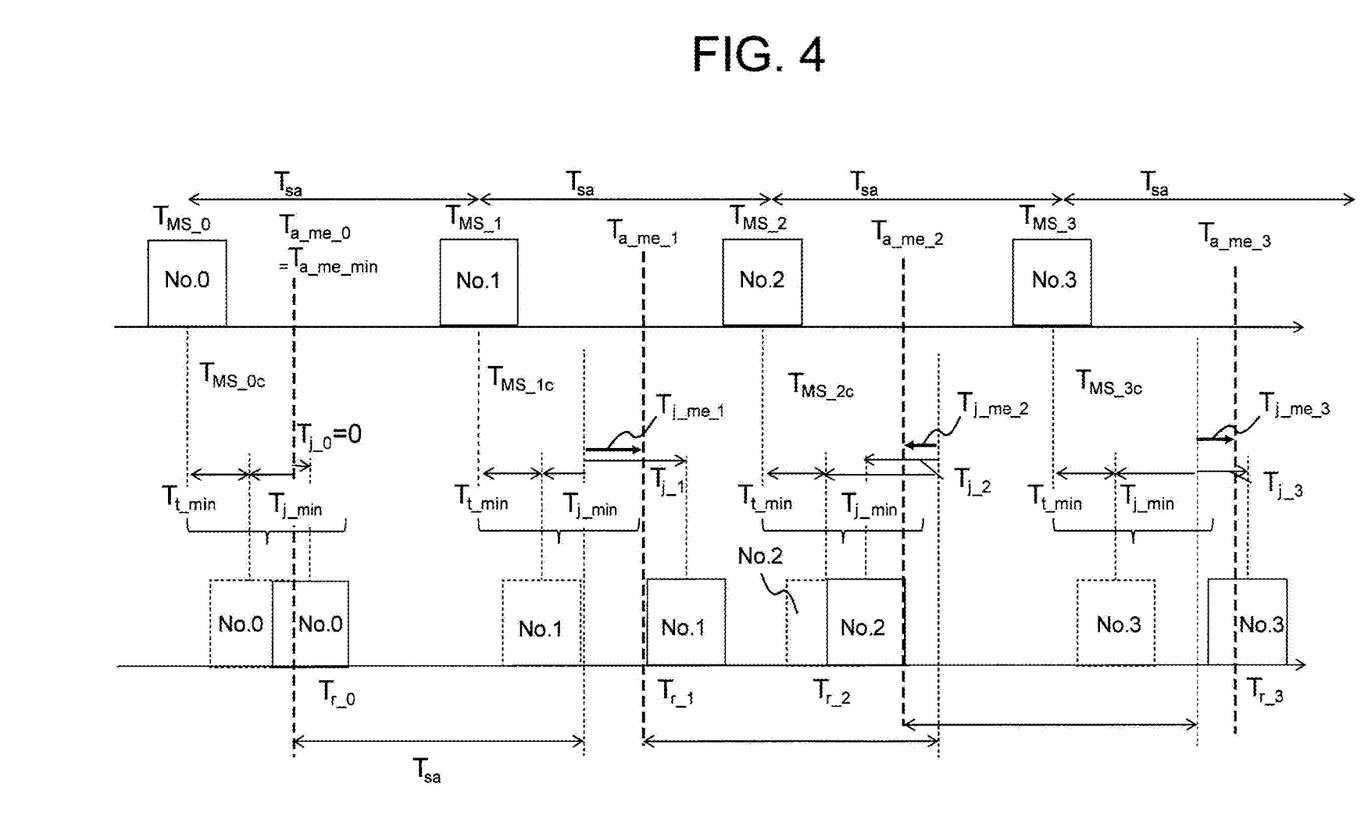
FIG. 4 is a timing diagram for explaining a method of estimating an event detection time point by a data receiving unit.

FIG. 4 is a timing diagram for explaining a method of estimating an event detection time point $T_{MS\_i}$ in the data receiving unit 130.

In FIG. 4, the time point at which a sensor 110 detects an event is denoted by $T_{MS\_i}$, and the detection data generated at that time point is denoted as No. i. In FIG. 4, i=0, 1, 2, or 3.

The detection data is sent to the transmission path 101 after an internal delay time associated with internal processing in the sensor 110. The detection data sent to the transmission path 101 is received by the data receiving unit 130 at a time point $T_{r\_i}$ after a transmission delay time.

The data receiving unit 130 performs reception processing in the reception I/F unit 131. Specifically, the reception I/F unit 131 reads the detection data stored in a reception buffer in the reception I/F unit 131 through reception interrupt processing, and transfers this detection data to the correlated-information storage unit 140.

The reception I/F unit 131 feeds concurrently a data reception notification to the reception-time-point measuring unit 132, and the event-detection-time-point estimation unit 139 stores the estimated event detection time point $T_{MS\_ic}$ by correlating it with the corresponding detection data (No. i) in the correlated-information storage unit 140.

The sensor 110 detects events during fixed sampling periods $T_{sa}$, and sends detection data as detection results to the transmission path 101. When the system delay time is fixed, the receiving timings of the data receiving unit 130 also coincide with the fixed periods $T_{sa}$, but actually, as illustrated in FIG. 4, the intervals between the receiving time points $T_{r\_0}$, $T_{r\_1}$, $T_{r\_2}$, and $T_{r\_3}$ of the data receiving unit 130 vary and do not coincide with the fixed value $T_{sa}$.

In FIG. 4, $T_{t\_min}$ denotes the minimum system delay time as the minimum value of the premeasured system delay time. When the reception I/F unit 131 receives detection data, a data reception notification is sent to the reception-time-point measuring unit 132.

The reception-time-point measuring unit 132 acquires the reception time point $T_{r\_i}$, which is the current time point, from the system clock 150 every time a data reception notification is received, and reports the reception time point $T_{r\_i}$ to the reception-time-point calculation unit 135.

The minimum system delay time $T_{t\_min}$, which is the minimum value of the system delay time, is premeasured, and the value is stored in the minimum-system-delay-time storage unit 133. The sampling-period storage unit 134 stores the event detection periods during which the sensor 110 detects an object, that is, the sampling periods $T_{sa}$ during which data is output to the transmission path 101.

In FIG. 4, the reception-time-point calculation unit 135 calculates an expected reception time point $T_{a\_me\_i}$ from the average jitter $T_{j\_me\_i}$ or the average value of the jitter $T_{j\_i}$, which is the arrival-time-point difference relative to the reception timings during the fixed periods.

The expected reception time point $T_{a\_me\_i}$ is calculated by using the above expression (4).

The jitter $T_{j\_i}$ is calculated by using the above expression (2) and is the deviation from the expected reception time point $T_{a\_me\_i}$.

$T_{j\_min}$ denotes the minimum-system-delay jitter as the jitter at the minimum reception time and denotes the maximum jitter in the direction in which the reception time from the expected reception time point $T_{a\_me\_i}$ becomes earlier. The minimum-reception-time jitter storage unit 138 stores the maximum jitter in the direction in which the reception time point becomes earlier, out of the jitters at the times of reception of detection data estimated by the jitter estimation unit 137. At this time, the minimum-reception-time expected-reception-time-point storage unit 136 stores the expected reception time point $T_{a\_me\_i}$ fed from the reception-time-point calculation unit 135 as a minimum-reception-time expected reception time point $T_{a\_me\_min}$. The minimum-reception-time jitter storage unit 138 stores the jitter $T_{j\_i}$ fed from the jitter estimation unit 137 at this time as the minimum-system-delay jitter $T_{j\_min}$ and also stores the corresponding communication sequence number $i_{min}$.

The event-detection-time-point estimation unit 139 uses the above definition to determine the event detection time point $T_{MS\_ic}$ of the sensor 110 by the above expression (5).

The specific operation of the data receiving unit 130 for estimating the event detection time point $T_{MS\_ic}$ of the sensor 110 described above will now be explained. First, the expected reception time point $T_{a\_me\_i}$ is determined by the reception-time-point calculation unit 135.

Figure 5:
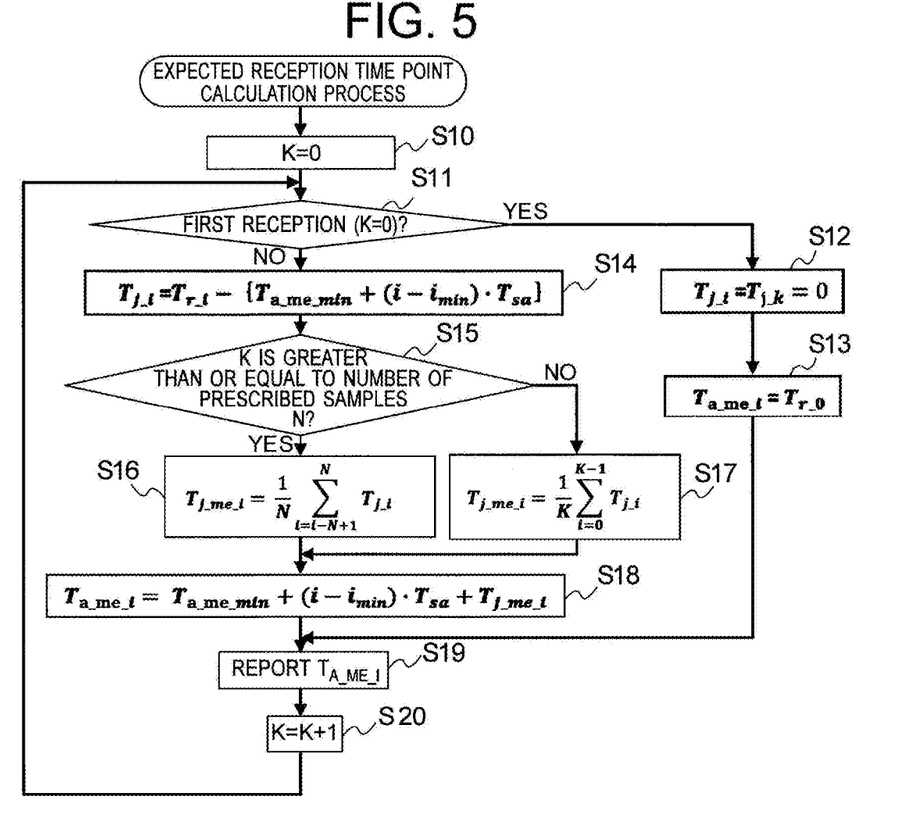
FIG. 5 is a flowchart illustrating a process of calculating an expected reception time point by a reception-time-point calculation unit.

FIG. 5 is a flowchart illustrating a calculation process of the expected reception time point $T_{a\_me\_i}$ by the reception-time-point calculation unit 135.

First, the reception-time-point calculation unit 135 sets the number K to be the initial value "0" (step S10).

Next, the reception-time-point calculation unit 135 determines whether or not the detection data is received for the first time after the start-up of the data receiving unit 130 (step S11). If it is the first reception (Yes in step S11), the process proceeds to step S12. If it is not the first reception (No in step S11), the process proceeds to step S14.

In step S12, the reception-time-point calculation unit 135 performs initialization, which is a process of setting the value of the jitter $T_{j\_i}=T_{j\_k}$ to "0." That is, the reception-time-point calculation unit 135 presumes that jitter due to system delay does not exist in the detection data received for the first time, and establishes $T_{j\_i}=0$.

The reception-time-point calculation unit 135 then sets the expected reception time point $T_{a\_me\_i}$ to be the first reception time point $T_{r\_0}$. The process then proceeds to step S19.

If it is determined in step S11 that it is not the first reception (No in step S11), the process proceeds to step S14. In step S14, the reception-time-point calculation unit 135 calculates the jitter $T_{j\_i}$ by using the above expression (2).

The reception-time-point calculation unit 135 then determines whether or not the number K is equal to or greater than the prescribed number of samples N (step S15). If the number K is equal to or greater than the prescribed number of samples N (Yes in step S15), the process proceeds to step S16, and if the number K is less than the prescribed number of samples N (No in step S15), the process proceeds to step S17.

In step S16, the reception-time-point calculation unit 135 determines the average jitter $T_{j\_me\_i}$, which is the moving average of the past jitter $T_{j\_i}$ in the number of samples N, by using the above expression (1). The process then proceeds to step S18.

In step S17, the reception-time-point calculation unit 135 determines the average jitter $T_{j\_me\_i}$ by using the expression (3). The process then proceeds to step S18.

In step S18, the reception-time-point calculation unit 135 determines the expected reception time point $T_{a\_me\_i}$ by using the above expression (4). The process then proceeds to step S19.

In step S19, the reception-time-point calculation unit 135 feeds the expected reception time point $T_{a\_me\_i}$ to the event-detection-time-point estimation unit 139 and the jitter estimation unit 137.

The reception-time-point calculation unit 135 then increments the number K by "1" (step S20), and the process returns to step S11.

As described above, each time the reception-time-point measuring unit 132 receives the latest detection data, the reception-time-point calculation unit 135 receives a notification of the corresponding reception time point and performs the process illustrated in FIG. 5.

Figure 6:
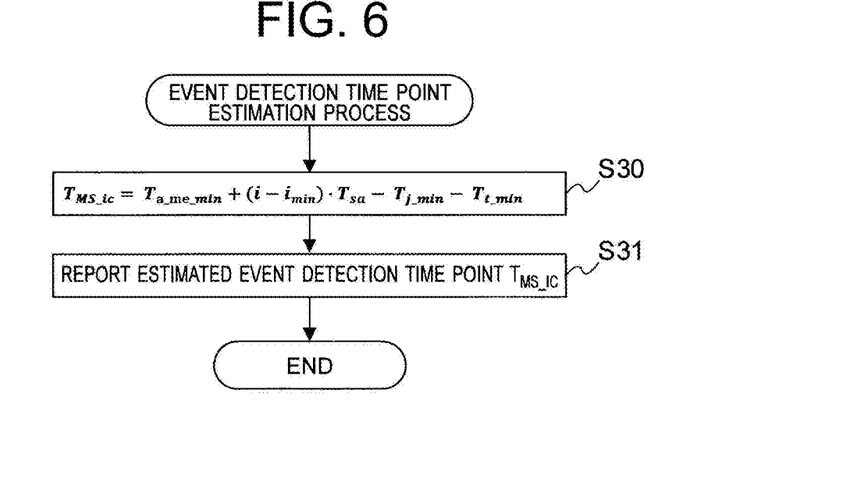
FIG. 6 is a flowchart illustrating a process of estimating an event detection time point by an event-detection-time-point estimation unit.

FIG. 6 is a flowchart illustrating an estimation process of an event detection time point $T_{MS\_ic}$ by the event-detection-time-point estimation unit 139 of the data receiving unit 130.

First, the event-detection-time-point estimation unit 139 estimates the event detection time point $T_{MS\_ic}$ by calculating the event detection time point $T_{MS\_ic}$ by using the above expression (5) (step S30).

The event-detection-time-point estimation unit 139 then stores the calculated event detection time point $T_{MS\_ic}$ in the correlated-information storage unit 140 (step S31). Note that when the correlated-information storage unit 140 receives the calculated event detection time point $T_{MS\_ic}$, the correlated-information storage unit 140 correlates the detection data that has already been temporarily accumulated via the reception I/F unit 131 from the sensor 110 with the calculated event detection time point $T_{MS\_ic}$, and stores them as correlated information. Note that the correlated information is fed to the integration processing unit 160.

Figure 7:
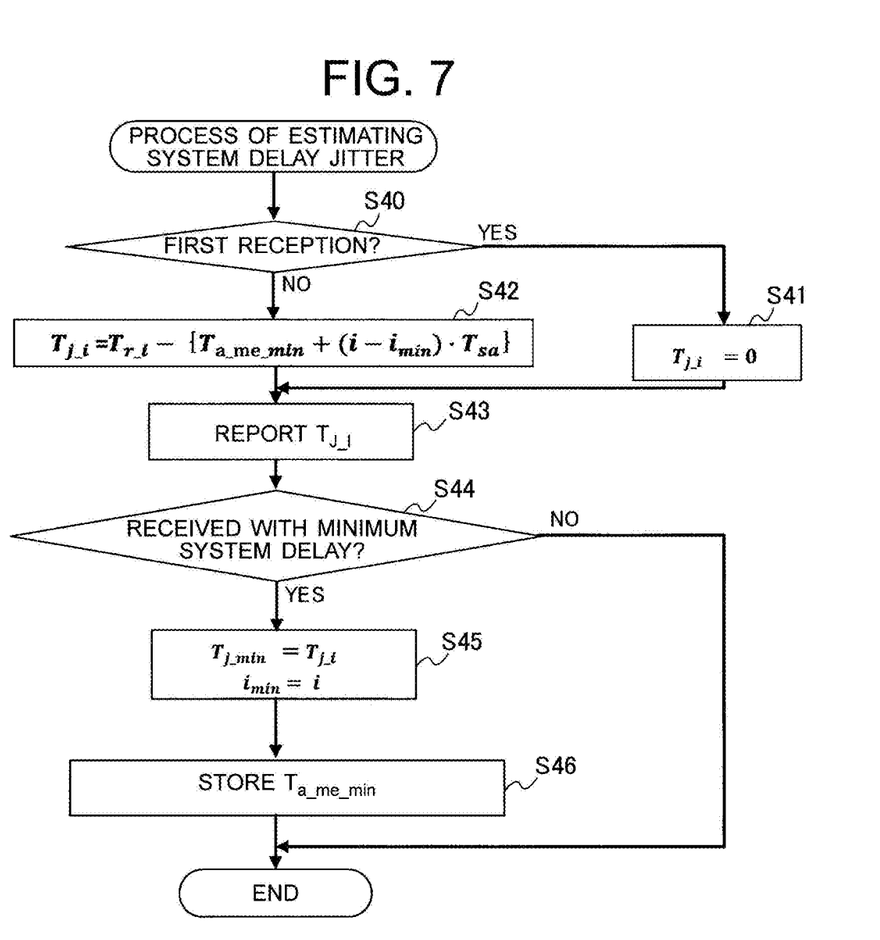
FIG. 7 is a flowchart illustrating a process of estimating jitter by a jitter estimation unit.

FIG. 7 is a flowchart illustrating the estimation process of the jitter $T_{j\_i}$ by the jitter estimation unit 137.

First, the jitter estimation unit 137 determines whether or not detection data has been received for the first time after the start-up of the data receiving unit 130 (step S40). If it is the first reception (Yes in step S40), the process proceeds to step S41, and if it is not the first reception (No in step S40), the process proceeds to step S42.

In step S41, the jitter estimation unit 137 initializes the jitter $T_{j\_i}$ to "0." The process then proceeds to step S43.

In step S42, the jitter estimation unit 137 determines the jitter $T_{j\_i}$ by using the above expression (2). The process then proceeds to step S43.

In step S43, the jitter estimation unit 137 stores the jitter $T_{j\_i}$ in the correlated-information storage unit 140.

Next, the jitter estimation unit 137 determines whether or not the current jitter $T_{j\_i}$ has been received with a minimum system delay time as described above (step S44). If the reception is with the minimum system delay time (Yes in step S44), the process proceeds to step S45, and if the reception is not with the minimum system delay time (No in step S44), the process ends.

In step S45, the jitter estimation unit 137 updates the minimum-system-delay jitter $T_{j\_min}$ stored in the minimum-reception-time jitter storage unit 138 with the jitter $T_{j\_i}$, and updates the sequence number $i_{min}$ of the minimum reception time with the sequence number i.

The jitter estimation unit 137 then causes the reception-time-point calculation unit 135 to store the expected reception time point $T_{a\_me\_i}$ as the minimum-reception-time expected reception time point $T_{a\_me\_min}$ in the minimum-reception-time expected-reception-time-point storage unit 136.

Figure 8:
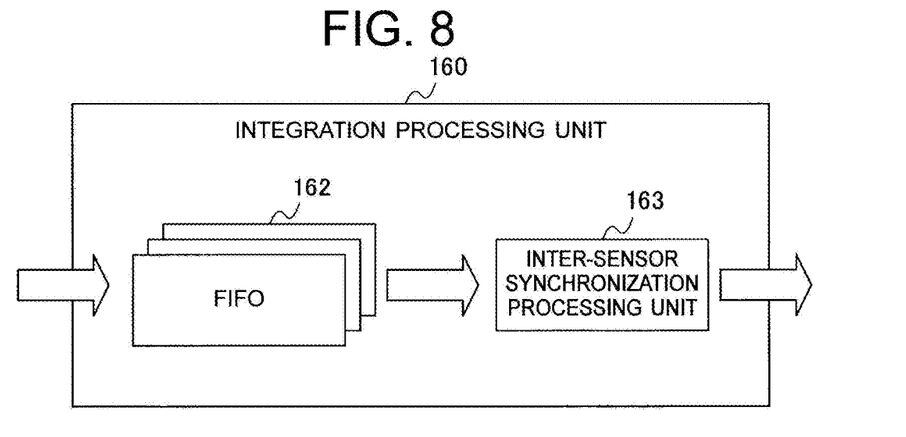
FIG. 8 is a block diagram schematically illustrating an example of the configuration of an integration processing unit.

FIG. 8 is a block diagram schematically illustrating an example configuration of the integration processing unit 160.

The integration processing unit 160 includes first in, first out (FIFO) buffers 162 functioning as the storage units 161 and an inter-sensor synchronization processing unit 163.

The FIFO buffers 162 are provided for the respective sensors 110.

The inter-sensor synchronization processing unit 163 performs synchronization processing for synchronizing data between the sensors 110 by using the correlated information stored in the FIFO buffers 162.

Figure 9:
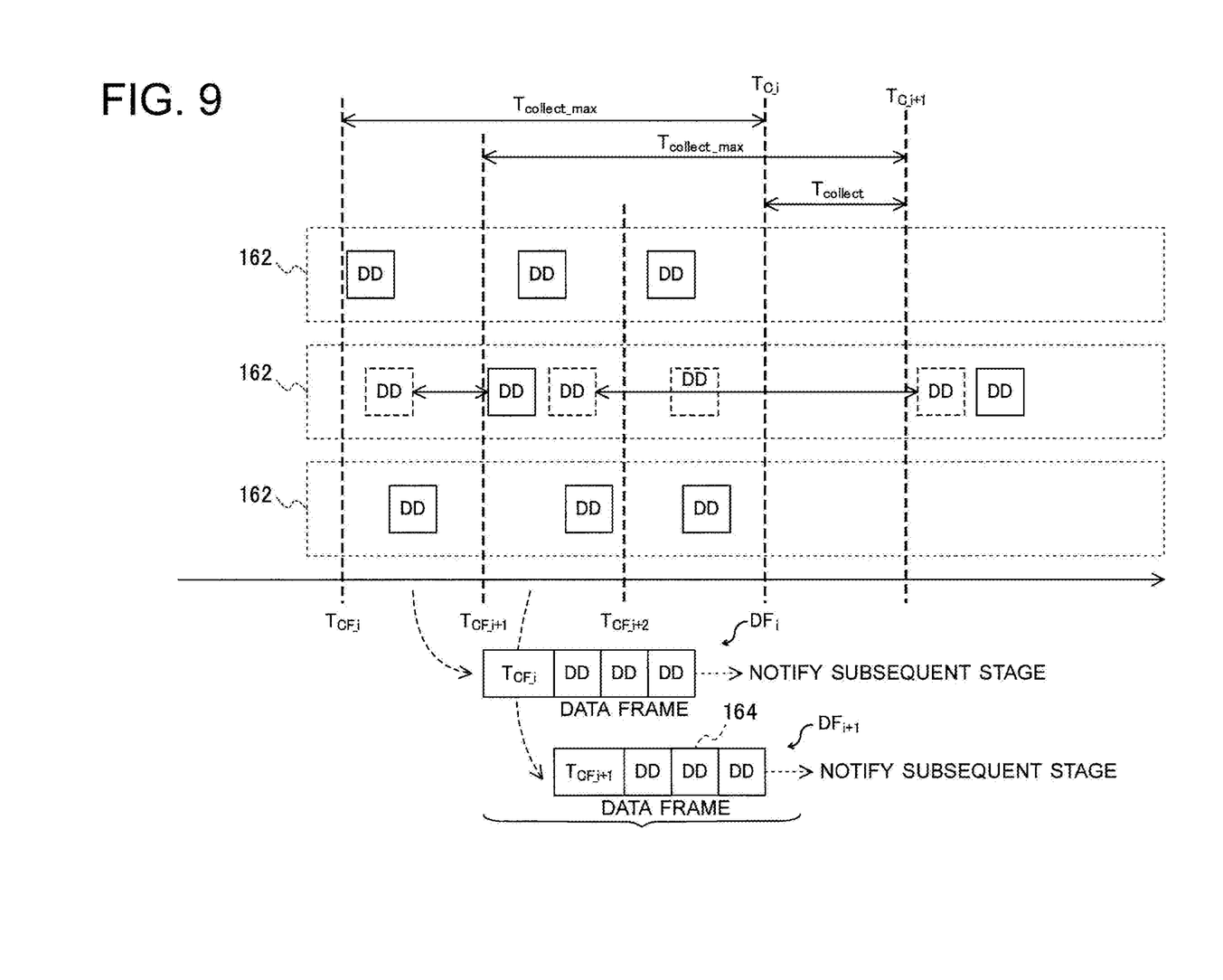
FIG. 9 is a schematic diagram for explaining the operation of the integration processing unit.

FIG. 9 is a schematic diagram for explaining the operation of the integration processing unit 160.

The FIFO buffers 162 provided for the respective sensors 110 temporarily store event detection time points $T_{MS\_ic}$ or jitter $T_{j\_i}$ correlated with detection data DD.

The inter-sensor synchronization processing unit 163 collects, from each of the FIFO buffers 162, detection data DO having an event detection time point close to a past time point by a maximum collection waiting time $T_{collect\_max}$ from the collection time points $T_{C\_i}$ and $T_{C\_i+1}$ of each fixed data collection time period $T_{collect}$. Here, it is ideal that the maximum collection waiting time $T_{collect\_max}$ be sufficient for absorbing the data delay caused by the system delay jitter.

The collected detection data DD is reported to a processing device in a subsequent stage in one data frame also including the time point used for the collection.

FIG. 9 illustrates a data frame $DF_i$ collected at a time point $T_{CF\_i}$ and a data frame $DF_{i+1}$ collected at a time point $T_{CF\_i+1}$.

Note that, as in the data frame $DF_{i+1}$ illustrated in FIG. 9, the detection data DD 164 that is not received before the collection time point $T_{CF\_i+1}$ is missing from the data frame $DF_{i+1}$. Note that such detection data DD 164 occurs when the system delay jitter is larger than the maximum collection waiting time $T_{collect\_max}$.

Next, the effect of the above-described embodiments will be described.

For example, the effect of the present embodiment will be described in comparison with a comparative example in which an event detection time point $T_{MS\_ib}$ is estimated by using the above expression (3) and the following expressions (6) to (8) in place of the above expressions (1) to (5).

In this comparative example, as indicated in the expressions (6) to (8), the event detection time point $T_{MS\_ib}$ is estimated by using the expected reception time point $T_{a\_me\_i}$ determined one sample period earlier, not the expected reception time point $T_{a\_me\_min}$ of the minimum reception time in the present embodiment.

[Expression 6]

$$T_{j\_i} = T_{r\_i} - (T_{a\_me\_min} + T_{sa}) \qquad (6)$$

[Expression 7]

$$T_{a\_me\_i} = T_{a\_me\_min} + T_{sa} + T_{j\_me\_i} \quad (7)$$

[Expression 8]

$$T_{MS\_ib} = T_{a\_me\_i} - T_{j\_min} - T_{t\_min} \quad (8)$$

Figure 10A:
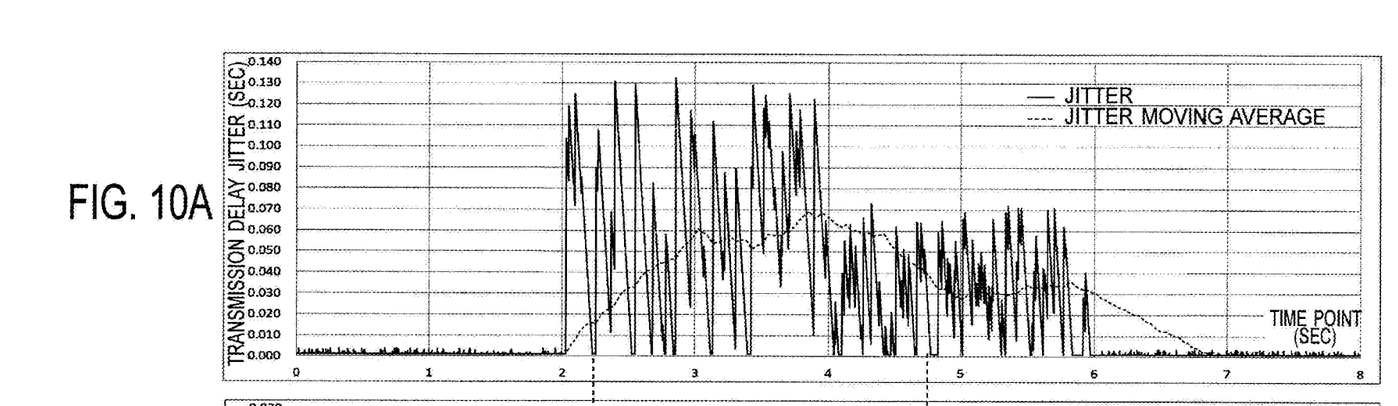
FIGS. 10A and 10B are graphs for explaining an estimated error between an embodiment and a comparative example in simulation.
Figure 10B:
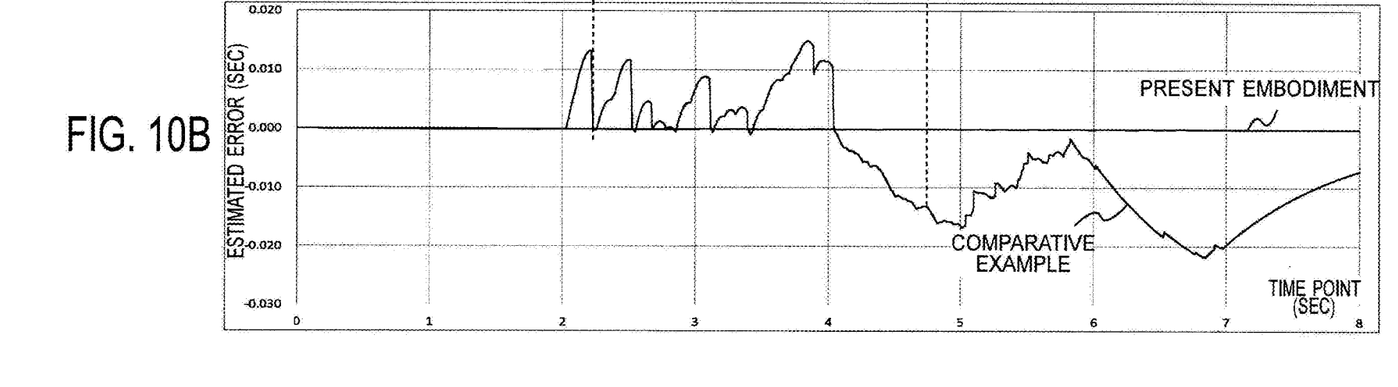

FIGS. 10A and 10B are graphs for explaining estimated errors of the present embodiment and a comparative example in simulation.

Figure 11:
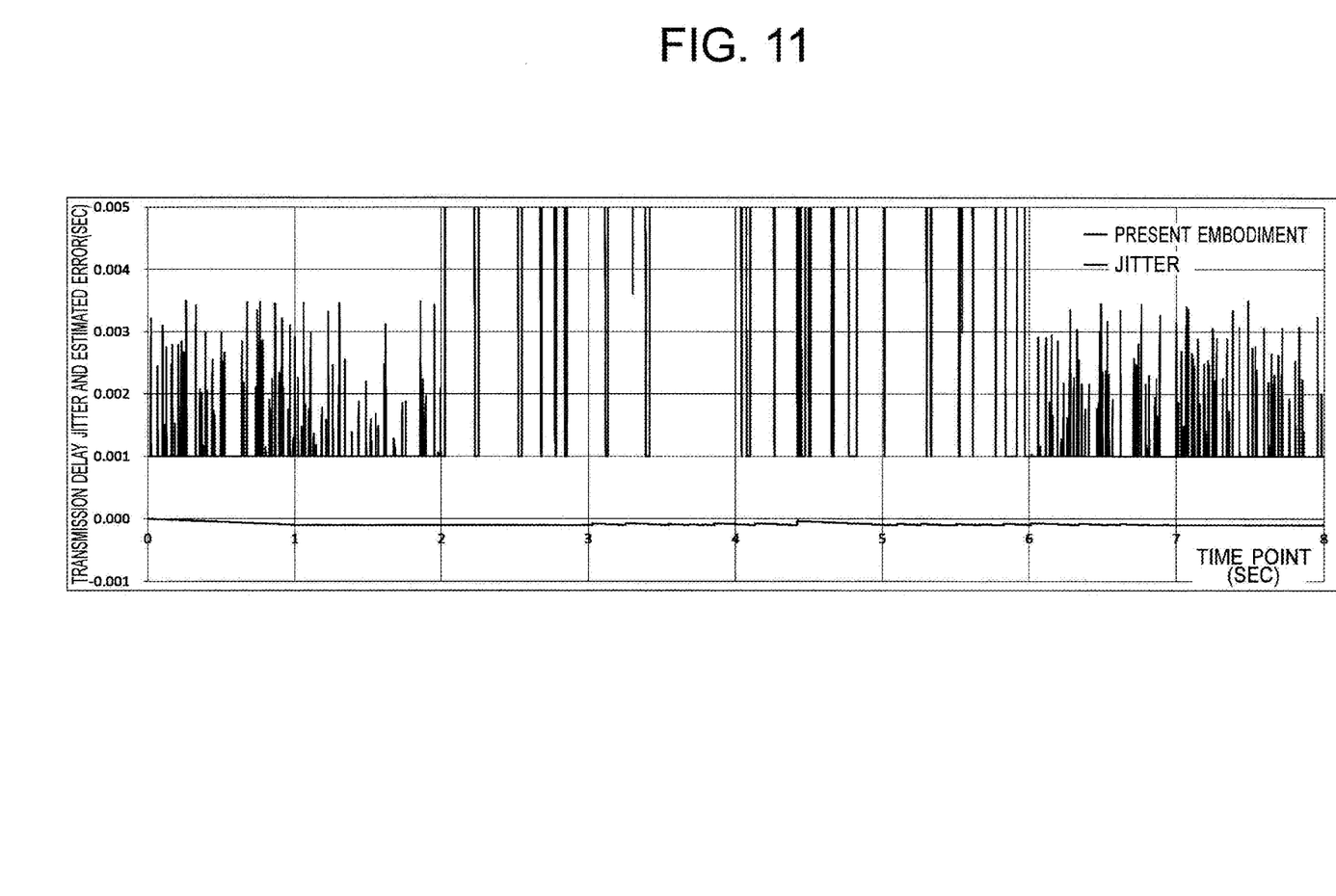
FIG. 11 is an enlarged view of a portion of FIG. 10A.

FIG. 10A is a diagram illustrating an example of system delay distribution used for simulation for comparison, and FIG. 11 is an enlarged diagram of a portion of FIG. 10A.

FIG. 10B illustrates estimated errors of the present embodiment and the comparative example in the case illustrated in FIG. 10A.

In the simulations, as illustrated in FIG. 10A, the sampling period is 1 ms, and the average system delay time fluctuates from 1.08 ms to 62.4 ms at the 2-second time point during operation, the average system delay time fluctuates from 62.4 ms to 29.36 ms at the 4-second time point, and the average system delay time fluctuates from 29.3 ms to 1.09 ms at the 6-second time point. An example of a case of large fluctuation of the average system delay time as described above is a case of large fluctuation of the volume of data relating to communications exchanged on the transmission path 101. Examples of such a case include a case of large fluctuation of electromagnetic noise, e.g., remote sensing of motor internal information, a case of large fluctuation of the electromagnetic noise level in accordance with the motor rotation speed or load torque, and a case of large fluctuation of system delay time due to retry transmission in response to a packet error occurring in wireless communication. The event detection time point $T_{MS\_ic}$ estimated when the data receiving unit 130 according to the present embodiment receives such data is compared with the event detection time point $T_{MS\_ib}$ of a comparative example.

As illustrated in FIG. 10B, in the present embodiment, even when the average system delay time fluctuates as described above, the error of the event detection time point is substantially 0 ms.

In contrast, in the comparative example, the error increases during fluctuation of the system delay time, particularly during large fluctuation of the average system delay value. In particular, during decreasing fluctuation of the average system delay time decreases, e.g., the fluctuation from the 4-second time point to the 6-second time point and the fluctuation from the 6-second time point to the 8-second time point, the error increases and takes time to converge to "0."

As illustrated in FIG. 10B, during the time period from the 2-second time point to the 4-second time point in the comparative example, the error is zero because the true value of the system delay time has been obtained through premeasurement when the data was received with the minimum system delay time. However, in the comparative example, the error is not "0" during the time period from the 4-second time point to the 6-second time point and the time period from 6-second time point to the 8-second time point, even if the system delay time is a minimum system delay time. In this case, the estimated error at the event detection time point is large because the expected reception time point $T_{a\_me\_i}$ is updated in a decreasing direction, and thus the minimum-system-delay jitter $T_{j\_min}$ is not updated, i.e., the minimum-system-delay jitter $T_{j\_min}$ is not maximized in the negative direction even when data is received with a minimum system delay time.

Since the minimum jitter in the number of moving average samples is applied as the minimum-system-delay jitter $T_{j\_min}$, the minimum-system-delay jitter $T_{j\_min}$ is obliterated at the 5-second time point after the elapse of 1000 sample times after the average system delay becomes very small at the 4-second time point, and finally new minimum-system-delay jitter $T_{j\_min}$ starts to be applied.

In the comparative example, the error finally converges at the 6-second time point because the update of the expected reception-time-point value requires time corresponding to the number of moving average samples before the error converges. In contrast, the error of the event detection time point $T_{MS\_ic}$ in the present embodiment is not affected by the fluctuation of the system delay time, and robust time estimation for environmental fluctuation is possible. This is possible because the estimated error is small as a result of the jitter, the expected reception time point, and the event detection time point being determined from the above expressions (2), (4), and (5) by using the expected reception time point for an invariant minimum reception time in the transmission system.

As described above, according to the present embodiment, in a system for transmitting data from a transmitting side to the data receiving unit 130, the data receiving unit 130 can estimate the event detection time point $T_{MS\_ic}$ with high accuracy even under an environment in which the system delay time has jitter.

Furthermore, because the jitter, the expected reception time point, and the event detection time point are determined by using the expected reception time point for an invariant minimum reception time in the transmission system, the estimated error can be small even when the average system delay time greatly fluctuates.

According to the present embodiment, the event detection time point can be estimated with high accuracy because there is no need for system restrictions, such as exchange of synchronization packets for system time point synchronization between the receiving side and the transmitting side or transmission of time point information at the time of event detection together with sensor data from the sensor side. When the transmitting side is a simple sensor, the sensor may not have a system clock, or even if the sensor can have a system clock, a PLL may be required to drive the clock at the same clock frequency as that of the receiving side, or a time synchronization packet transmitting function may be required to correct the clock deviation. However, in the present embodiment, the sensing time point can be estimated even without such restriction conditions of such a system.

Even when the receiving-unit arrival time, of the detection data to be collected in the same sampling period varies due to system delay, the FIFO buffers 162 are provided in the integration processing unit 160 to add estimated values of the sensed event detection time points to the respective pieces of detection data, so that the inter-sensor synchronization processing unit 163 pairs the detection data correctly sensed in the same period, forms a data frame, and outputs the data frame. Consequently, arithmetic processing, etc., using the multiple pieces of sensor data can be accurately performed in the subsequent stage.

DESCRIPTION OF REFERENCE CHARACTERS 100 communication system; 110 sensor; 120 information processing device; 130 data receiving unit; 131 reception I/F unit; 132 reception-time-point measuring unit; 133 minimum-system-delay-time storage unit; 134 sampling-period storage unit; 135 reception-time-point calculation unit; 136 minimum-reception-time expected-reception-time-point storage unit; 137 jitter estimation unit; 138 minimum-reception-time jitter storage unit; 139 event-detection-time-point estimation unit; 140 correlated-information storage unit; 150 system clock; 160 integration processing unit; 162 FIFO buffer; 163 inter-sensor synchronization processing unit.

What is claimed is:

1. An information processing device comprising:
   a receiver to sequentially receive multiple pieces of detection data sent from a sensor detecting an event during a sampling period, the sampling period being fixed;
   a memory to store a minimum system delay time and a minimum-reception-time expected reception time point calculated to be a time point at which target detection data is to be received, the minimum system delay time being predetermined as a minimum value of system delay times each corresponding to a time from a time point at which the sensor detects the event to the corresponding reception time point, the target detection data being one piece of detection data, out of the multiple pieces of detection data, sent with a minimum time of the system delay times before latest detection data is received; and
   a processing circuitry
   to measure reception time points at which the multiple pieces of detection data are respectively received,
   to estimate a minimum-system-delay jitter to be a difference between the minimum-reception-time expected reception time point and the reception time point of the target detection data, and
   to estimate an event detection time point from the minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

2. The information processing device according to claim 1, wherein
   the processing circuitry calculates an expected reception time point from the minimum-reception-time expected reception time point, the reception time point of the latest detection data, and the sampling period, the expected reception time point being a time point at which the latest detection data is to be received, and
   the minimum-reception-time expected reception time point is an expected reception time point of the target detection data calculated by the processing circuitry from a previous minimum-reception-time expected reception time point, the reception time point of the target detection data, and the sampling period, the previous minimum-reception-time expected reception time point being a calculated expected reception time point of previous target detection data, the previous target detection data being one piece of detection data, out of the multiple pieces of detection data, sent with a minimum time of the system delay times before the target detection data is received.

3. The information processing device according to claim 2, wherein when the reception time point of the latest detection data is earlier than the expected reception time point of the latest detection data, and when a difference between the expected reception time point of the latest detection data and the reception time point of the latest detection data is larger than the minimum-system-delay jitter, the processing circuitry sets the difference between the expected reception time point of the latest detection data and the reception time point of the latest detection data to be a new minimum-system-delay jitter, and replaces the minimum-reception-time expected reception time point stored in the memory with the expected reception time point of the latest detection data, to set the expected reception time point of the latest detection data to be a new minimum-reception-time expected reception time point.

4. The information processing device according to claim 3, wherein
   the memory stores correlated information correlating the latest detection data and the event detection time point; and
   the processing circuitry collectively outputs, at regular period, the detection data correlated with past event detection time points corresponding to a maximum waiting time from the correlated information.

5. The information processing device according to claim 2, wherein
   the memory stores correlated information correlating the latest detection data and the event detection time point; and
   the processing circuitry collectively outputs, at regular period, the detection data correlated with past event detection time points corresponding to a maximum waiting time from the correlated information.

6. A non-transitory computer-readable medium that stores therein a program that causes a computer to execute processes of:
   sequentially receiving multiple pieces of detection data sent from a sensor detecting an event during a sampling period, the sampling period being fixed;
   measuring reception time points at which the multiple pieces of detection data are respectively received;
   storing a minimum system delay time, the minimum system delay time being predetermined as a minimum value of system delay times each corresponding to a time from a time point at which the sensor detects the event to the corresponding reception time point;
   storing a minimum-reception-time expected reception time point calculated to be a time point at which target detection data is to be received, the target detection data being one piece of detection data, out of the multiple pieces of detection data, sent with a minimum time of the system delay times before latest detection data is received;
   estimating a minimum-system-delay jitter to be a difference between the minimum-reception-time expected reception time point and the reception time point of the target detection data; and
   estimating an event detection time point from the minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

7. An information processing method comprising:
   sequentially receiving multiple pieces of detection data sent from a sensor detecting an event during a sampling period, the sampling period being fixed;

measuring reception time points at which the multiple pieces of detection data are respectively received;

storing a minimum-reception-time expected reception time point calculated to be a time point at which target detection data is to be received, the target detection data being one piece of detection data, out of the multiple pieces of detection data, sent with a minimum time of the delay times before latest detection data is received, the system delay time being a time from a time point at which the sensor detects the event to the corresponding reception time point;

estimating a minimum-system-delay jitter to be a difference between the minimum-reception-time expected reception time point and the reception time point of the target detection data; and estimating an event detection time point from a minimum value of the system delay time predetermined as a minimum system delay time, the minimum-reception-time expected reception time point, a time period from detection of the event corresponding to the target detection data to detection of the event corresponding to the latest detection data, and the minimum-system-delay jitter, the event detection time point being a time point at which the event corresponding to the latest detection data is detected.

\* \* \* \* \*